(12) United States Patent
Minear et al.

(10) Patent No.: US 8,763,106 B2
(45) Date of Patent: Jun. 24, 2014

(54) APPLICATION STATE SHARING IN A FIREWALL CLUSTER

(75) Inventors: Spencer Minear, Fridley, MN (US); Paul Meyer, White Bear Lake, MN (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/227,825

(22) Filed: Sep. 8, 2011

(65) Prior Publication Data
US 2013/0067556 A1    Mar. 14, 2013

(51) Int. Cl.
*G06F 9/00* (2006.01)

(52) U.S. Cl.
USPC .......................................................... 726/11

(58) Field of Classification Search
USPC .......................................................... 726/11
See application file for complete search history.

(56) References Cited

U.S. PATENT DOCUMENTS

| | | | |
|---|---|---|---|
| 6,772,226 B1 | 8/2004 | Bommareddy et al. | |
| 6,880,089 B1 | 4/2005 | Bommareddy et al. | |
| 7,254,834 B2* | 8/2007 | Goddard | 726/11 |
| 7,266,715 B1 | 9/2007 | Bazzinotti et al. | |
| 7,447,901 B1 | 11/2008 | Sullenberger et al. | |
| 7,844,731 B1* | 11/2010 | Zhou | 709/238 |
| 8,015,298 B2* | 9/2011 | Yevmenkin et al. | 709/227 |
| 2003/0002494 A1* | 1/2003 | Kuukankorpi et al. | 370/386 |
| 2003/0018914 A1 | 1/2003 | Cheng et al. | |
| 2005/0177869 A1* | 8/2005 | Savage et al. | 726/11 |
| 2005/0240989 A1 | 10/2005 | Kim et al. | |
| 2006/0013227 A1* | 1/2006 | Kannan | 370/392 |
| 2006/0075478 A1 | 4/2006 | Hyndman et al. | |
| 2006/0143699 A1* | 6/2006 | Nagata et al. | 726/11 |
| 2006/0195896 A1 | 8/2006 | Fulp et al. | |
| 2007/0180226 A1* | 8/2007 | Schory et al. | 713/153 |
| 2007/0180513 A1* | 8/2007 | Raz et al. | 726/12 |
| 2007/0294754 A1* | 12/2007 | Finkelstein et al. | 726/11 |
| 2008/0028456 A1 | 1/2008 | O'Rourke et al. | |
| 2008/0098113 A1* | 4/2008 | Hansen et al. | 709/226 |
| 2008/0115205 A1 | 5/2008 | Aaron | |
| 2009/0113051 A1* | 4/2009 | Franklin | 709/225 |
| 2011/0030049 A1 | 2/2011 | Adams et al. | |
| 2012/0039231 A1 | 2/2012 | Suri et al. | |
| 2012/0057591 A1* | 3/2012 | Erman et al. | 370/389 |
| 2013/0073743 A1 | 3/2013 | Ramasamy et al. | |
| 2013/0152156 A1 | 6/2013 | Allison et al. | |

FOREIGN PATENT DOCUMENTS

| | | |
|---|---|---|
| WO | 0215514 A2 | 2/2002 |
| WO | 2013036646 A1 | 3/2013 |

OTHER PUBLICATIONS

International Search Report dated Jan. 23, 2013 regarding application No. PCT/US2012/053971.
Petri, Daniel, "What are IPSEC Policies?", Petri IT Knowledge base, Jan. 8, 2009, 7 pages, also available at <http://www.petri.co.il/what_are_ipsec_policies.htm>.
International Search Report regarding application No. PCT/US2012/063249 dated Dec. 27, 2012, 3 pages.

* cited by examiner

*Primary Examiner* — Teshome Hailu
*Assistant Examiner* — Abiy Getachew
(74) *Attorney, Agent, or Firm* — Wong, Cabello, Lutsch, Rutherford & Brucculeri, LLP.

(57) ABSTRACT

A firewall cluster system comprises a first node operable to receive a connection in a firewall cluster having three or more nodes, monitor packets of the received connection and determining application state data associated with the connection from the monitored packets in the first node, and share application state data with at least another node in the firewall cluster.

18 Claims, 3 Drawing Sheets

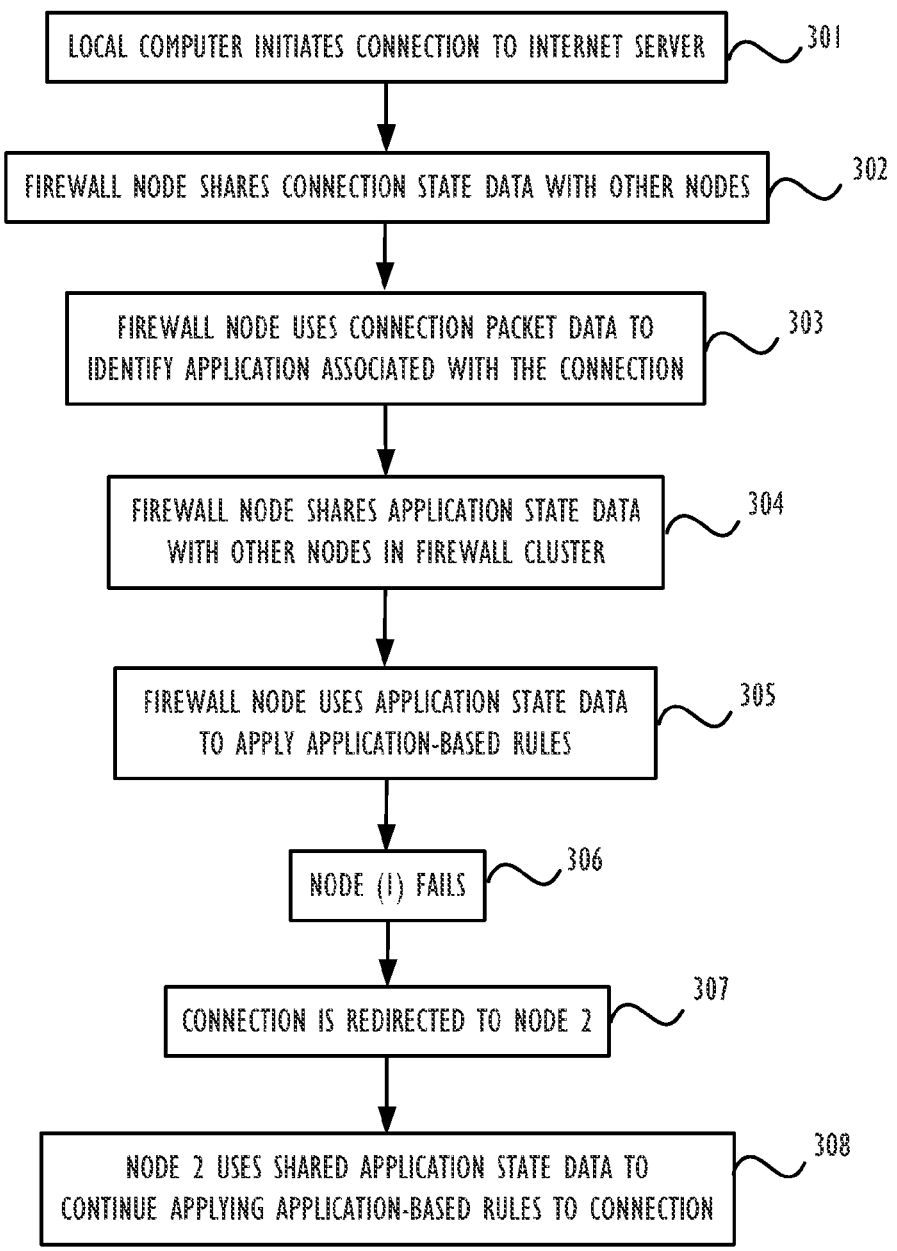

APPLICATION STATE SHARING IN A FIREWALL CLUSTER

FIELD OF THE INVENTION

The invention relates generally to firewall operation, and more specifically in one embodiment to application state sharing in a firewall cluster.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, computer users within an organization such as a corporation may on occasion attempt to perform unauthorized network communications, such as running file sharing programs or transmitting corporate secrets from within the corporation's network to the Internet.

For these and other reasons, many corporations, institutions, and even home users use a network firewall or similar device between their local network and the Internet. The firewall is typically a computerized network device that inspects network traffic that passes through it, permitting passage of desired network traffic based on a set of rules.

Firewalls perform their filtering functions by observing communication packets, such as TCP/IP or other network protocol packets, and examining characteristics such as the source and destination network addresses, what ports are being used, and the state or history of the connection. Some firewalls also examine packets traveling to or from a particular application, or act as a proxy device by processing and forwarding selected network requests between a protected user and external networked computers.

The firewall typically controls the flow of network information by monitoring connections between various ports, sockets, and protocols, such as by examining the network traffic in a firewall. Rules based on socket, port, application, and other information are used to selectively filter or pass data, and to log network activity. Firewall rules are typically configured to identify certain types of network traffic that are to be prohibited or that should have certain other restrictions applied, such as blocking traffic on ports known to be used for file sharing programs while virus scanning any received over a traditional FTP port, blocking certain applications or users from performing some tasks while allowing others to perform such tasks, and blocking traffic based on known attack patterns such as repeated queries to different ports from a common IP address.

But, the ability of a firewall to manage such connections when distributed across multiple computer systems is limited in that knowledge of a connection is typically stored only in the system handling the connection. Improved firewall distribution in a cluster is therefore desired.

SUMMARY

Various example embodiments of the invention comprise a firewall cluster system including a first node operable to receive a connection in a first node of a firewall cluster having three or more nodes, monitor packets of the received connection and determining application state data associated with the connection from the monitored packets in the first node, and share application state data with at least another node in the firewall cluster. Another node can use the application state data to continue processing the connection such as if the first node fails, or to provide load balancing.

BRIEF DESCRIPTION OF THE FIGURES

FIG. 3 is a flowchart illustrating a method of using shared application state data in a firewall cluster, consistent with an example embodiment of the invention.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
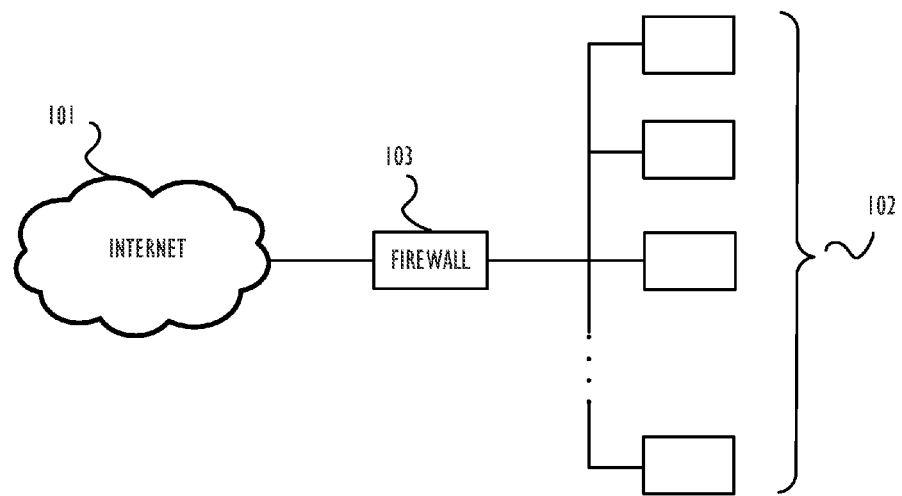
FIG. 1 shows an example network including a firewall, as may be used to practice some embodiments of the invention.

FIG. 1 illustrates a typical computer network environment, including a public network such as the Internet at 101, a private network 102, and a computer network device operable to provide firewall and intrusion protection functions shown at 103. In this particular example, the computer network device 103 is positioned between the Internet and the private network, and regulates the flow of traffic between the private network and the public network.

The network device 103 is in various embodiments a firewall device, and intrusion protection device, or functions as both. A firewall device or module within the network device provides various network flow control functions, such as inspecting network packets and dropping or rejecting network packets that meet a set of firewall filtering rules. As described previously, firewalls typically perform their filtering functions by observing communication packets, such as TCP/IP or other network protocol packets, and examining characteristics such as the source and destination network addresses, what ports are being used, and the state or history of the connection. Some firewalls also examine packets to determine what application has established the connection, or act as a proxy device by processing and forwarding selected network requests between a protected user and external networked computers. Firewalls often use "signatures" or other characteristics of undesired traffic to detect and block traffic that is deemed harmful or that is otherwise undesired.

Firewalls typically use sets of rules to filter traffic, such that what happens with any particular element of network data is dependent on how the rule set applies to that particular data. For example a rule blocking all traffic to port 6346 will block incoming traffic bound for that port on a server within the protected network, but will not block other data going to the same server on a different port number. Similarly, a rule blocking traffic originating from a file sharing program such as Shareaza will use patterns in the traffic to block Shareaza traffic on port 6346, but allow other traffic on port 6346.

But, in an environment where a firewall is implemented as a system distributed across multiple computers or nodes, such as in a large or complex system, the ability of multiple nodes to share a connection is limited by the managing node's information regarding the connection, such as socket information, application information, and the like regarding the connection. Some embodiments of the invention therefore provide a mechanism for sharing state information such as application type or other such connection data with other systems in a cluster firewall, enabling multiple nodes in the firewall cluster to process the same connection. This provides the cluster the ability to load balance by moving connection responsibility between systems, to manage failure of a node in the cluster by moving its connections to another machine, and to perform other such functions.

Figure 2:
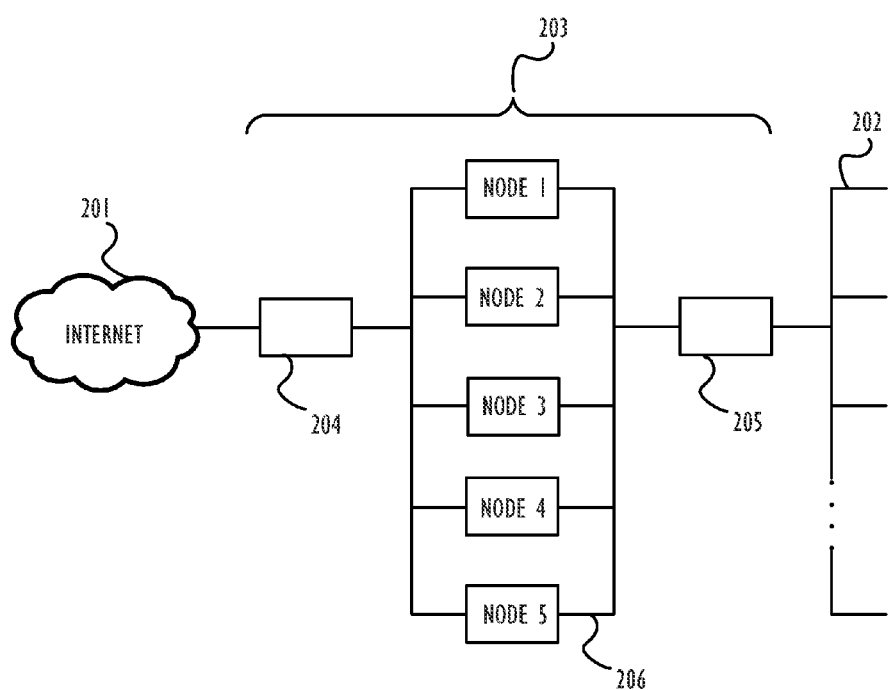
FIG. 2 shows an example network including a firewall cluster comprising multiple firewall nodes, as may be used to practice some embodiments of the invention.

In one such example, a firewall or intrusion protection system is implemented as a cluster or connected group of nodes that share processing traffic flowing through the firewall. FIG. 2 shows a network with a distributed firewall, as may be used to practice some embodiments of the invention. Here, a network such as the Internet 201 is coupled to an internal network 202 by a firewall, 203. The firewall 203 comprises an incoming traffic module 204 and an outgoing traffic module 205 that can perform functions such as load balancing and other firewall management functions. The firewall or intrusion protection rules are applied in firewall nodes 206, which are connected to one another by network connections as shown.

Here the five nodes shown each comprise a separate computer system running an instance of firewall or related software, operable to apply rules to traffic to selectively permit or block traffic flowing between the Internet 201 and the internal network 202. In an alternate embodiment, some nodes such as nodes 1, 2, and 3 execute a firewall application, while other nodes such as 4 and 5 execute an intrusion protection system (IPS) application. The nodes 204 and 205 are responsible for performing functions such as load balancing traffic routed to the firewall nodes 206, ensuring that the nodes are able to work together efficiently to provide higher throughput capability than a single node.

Some firewall embodiments perform complex connection identification functions that go beyond simple application of port, IP, and other such rules to a data stream. For example, some firewall examples include an application identification module that is operable to monitor the first several packets of a new connection, and to identify the application that has initiated the connection based on application communication profile information. Once the application is determined, application-specific rules can be applied to the connection, providing enhanced ability to control the data flowing through the firewall.

If a firewall node at 206 fails, another node can simply pick up the connection and apply the same traditional firewall rules based on port, IP address, and other such characteristics. But, although the five different firewall nodes at 206 in FIG. 2 can apply the same rules to a connection based on identifiable characteristics such as port and IP address, they cannot re-examine the first several packets of a link that is already established to apply application-based rules to the connection.

Some embodiments of the invention therefore provide a mechanism for application state sharing across nodes in a firewall cluster, enabling the firewall to move a connection subject to application-based rules to another node, such as for load balancing or to recover from a failed cluster node. This state sharing is in one embodiment handled via a network connection linking the nodes in the firewall cluster to one another, such as is shown in FIG. 2. Because session information for connections including application information is shared across nodes, the node receiving an established connection with an identified application can apply application-specific rules to either allow or deny traffic as determined by the firewall configuration.

The state sharing in some embodiments includes broadcasting state information to all the other nodes in the firewall cluster, such that the other nodes each have knowledge of the application state of connections on other nodes. In an alternate embodiment, a master node receives the application state data and stores the data, such that at least two nodes in the cluster have application state data for connections where application state data has been identified. The master node may therefore share its application state data with a backup master node or other designated node, so that failure of the master node will not result in loss of the application state data. In still other examples, a master node receives the application state information and then broadcasts the information to other nodes.

FIG. 3 shows an example of using application state sharing across nodes in a firewall to recover from a failed node, consistent with an example embodiment of the invention. At 301, a link is initiated between a computer in local network 202 and the Internet 201. The link between nodes is handled by node 1, which shares state information such as source and destination port and IP address as soon as the network connection is established at 302. After several packets of data have been exchanged between the local computer and the Internet server, the firewall can compare data patterns in the packets against data patterns associated with known applications at 303, determining in many instances what application has initiated the connection. The firewall node 1 then shares this application state data for the connection with other nodes at 304, and uses the application state data to apply application-specific rules to the firewall at 305.

At 306, node 1 fails, and the connection is redirected to node 2 at 307. Because node 2 has received application state data regarding the connection from node 1 previously, node 2 is able to resume filtering the data stream including applying application-specific rules to the connection at 308.

Although this example illustrates how a node can resume filtering a connection after a node fails, similar methods can be employed to move connections from one node to another in a distributed firewall cluster for applications such as load balancing, or reassignment of nodes to different tasks.

In one such example, firewall node 1 does not fail, but an intrusion protection system node that is one of two such nodes (not pictured) fails. The system desires to maintain a certain balance between the number of nodes providing firewall service and the number of nodes providing intrusion protection, and in this example the intrusion protection system has lost half its capacity when one of its two nodes failed. The system therefore reassigns firewall node 1 to replace the failed intrusion protection node, resulting in connections previously handled by firewall node 1 being redistributed across firewall nodes 2-5, as shown in FIG. 2.

These examples illustrate how sharing application state data in a firewall cluster can facilitate load balancing, failover, and other functions within the firewall cluster, making application-based filtering of network traffic in a firewall cluster more manageable and reliable.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A non-transitory computer readable medium comprising computer executable instructions stored thereon that when executed cause one or more processors to:
    receive connection information by a first node of a firewall cluster having three or more nodes;
    share firewall cluster state information upon establishing a connection;
    compare data patterns in packets received at the connection to known data patterns to generate application state data, the application state data indicating an identity of an application communicating with the first node; and
    share application state data with at least another node in the firewall cluster.

2. The non-transitory computer readable medium of claim 1, further comprising instructions that when executed cause the one or more processors to:
    share the connection information with at least another node in the firewall cluster prior to sharing the application state data.

3. The non-transitory computer readable medium of claim 1, wherein the application state data comprises the identity of the application communicating with the firewall cluster via the connection.

4. The non-transitory computer readable medium of claim 1, wherein sharing the application state data comprises broadcasting the application state data to other nodes in the firewall cluster.

5. The non-transitory computer readable medium of claim 1, wherein sharing the application state data comprises sending the application state data to a master node.

6. The non-transitory computer readable medium of claim 5, wherein the master node broadcasts the application state data to other nodes in the firewall cluster.

7. The non-transitory computer readable medium of claim 1, wherein the shared application state data is used to filter the connection in another node upon failure of the first node.

8. The non-transitory computer readable medium of claim 1, wherein the shared application state data is used to filter the connection in another node to provide load balancing in the firewall cluster.

9. A firewall cluster having three or more nodes, comprising:
    a plurality of processors, wherein each node of the firewall cluster is configured to execute on one or more of the plurality of processors; and
    a memory communicatively coupled to one or more of the plurality of processors,
    wherein a first node is operable to receive connection information, the first node operable to share firewall cluster state information upon establishing a connection, compare data patterns in packets received at the connection to known data patterns to generate application state data, and share the application state data with at least one other node of the firewall cluster, the application state data indicating an identity of an application communicating with the first node.

10. The firewall cluster of claim 9, wherein the first node is further operable to share the connection information with at least one other node in the firewall cluster prior to sharing the application state data.

11. The firewall cluster of claim 9, wherein sharing the application state data comprises broadcasting the application state data to other nodes in the firewall cluster.

12. The firewall cluster of claim 9, further comprising a master node, and wherein sharing the application state data comprises sending the application state data to the master node.

13. The firewall cluster of claim 12, wherein the master node is further operable to broadcast the application state data to other nodes in the firewall cluster.

14. The firewall cluster of claim 9, further comprising a second node operable to use the shared application state data associated with the connection to filter the connection in another node upon failure of the first node.

15. The firewall cluster of claim 9, further comprising a second node operable to use the shared application state data associated with the connection to filter the connection in another node to provide load balancing in the firewall cluster.

16. A non-transitory computer readable medium comprising instructions stored thereon to cause one or more processors to operate as a firewall cluster, the instructions to configure the one or more processors to:
    receive connection information at a first node of a firewall cluster having three or more nodes;
    share firewall cluster state information upon establishing a connection with at least one other node in the firewall cluster;
    compare data patterns in packets received at the connection to known data patterns to determine data associated with an application identity; and
    share at least a portion of the data associated with the application identity and data associated with the connection with two or more other nodes in the firewall cluster.

17. The non-transitory computer readable medium of claim 16, wherein the data associated with the application identity and the data associated with the connection is used to filter the connection in another node of the firewall cluster upon failure of the first node.

18. The non-transitory computer readable medium of claim 16, wherein the data associated with the application identity and the data associated with the connection is used to filter the connection in another node of the firewall cluster to provide load balancing in the firewall cluster.

* * * * *